July 21, 1964 W. H. MEIKLEJOHN 3,141,967

INFORMATION STORAGE APPARATUS

Filed May 19, 1961

Inventor:
William H. Meiklejohn,
by Richard A. Speer
His Attorney.

United States Patent Office 3,141,967
Patented July 21, 1964

3,141,967
INFORMATION STORAGE APPARATUS

William H. Meiklejohn, Scotia, N.Y., assignor to General Electric Company, a corporation of New York
Filed May 19, 1961, Ser. No. 111,277
8 Claims. (Cl. 235—183)

This invention relates to computing apparatus and more particularly to an apparatus making use of superconductive elements in a manner providing for integration.

Many present-day computer devices make use of cryogenic information storage circuits which include superconductive elements as component parts. Information is stored in the form of either flux or current which remains in the superconductor for long periods of time due to the absence of any appreciable electrical resistance. The magnetic flux field is commonly referred to as being "trapped" since there is no decay until the superconductor is rendered normally resistive and the supercurrent begins to decrease.

It has been known that flux can be trapped in a multiply-connected superconductor by applying a large field normal to the plane of a hole or opening in the superconductor and removing the field. Upon application of a field greater than the critical field for the superconductive material selected, nothing of importance happens as the field is reduced until the critical field is reached. At this point, reduction of the field by an amount $\Delta H$ below the critical field causes supercurrent to be generated in the superconductor of such a magnitude as to make up the $\Delta H$. As the field is further reduced, supercurrent increases so as to maintain essentially the critical field. The flux has as its source the supercurrent which was created within the superconductive body, so that destruction of all or any part of the supercurrent results in commensurate destruction of the attendant trapped flux.

Destruction of the supercurrent can be effected either by heating the superconductor to some point above the critical temperature or by subjecting it to magnetic fields in excess of the critical field strength. Making use of the fact that there is no supercurrent in the fields above the critical field, destruction of the supercurrent and the trapped flux can be effected by application of a magnetic field that has no component perpendicular to the plane of the hole or opening in the superconductor. In the case of a ring-shaped superconductor, this can be done by placing a toroidal winding on the ring and passing a current through the winding. This field will be orthogonal to the trapped flux and therefore will not directly change the supercurrent in the manner described above. However, when this field is greater than the critical field, it will destroy the supercurrent because the material will be in the normally resistive state. Thus, the supercurrent immediately becomes a common variety of current and decays with a time constant determined by the circuit.

Most cryogenic storage elements currently used in low temperature computers are binary elements whose information storage abilities are limited. With binary elements, it is possible only to determine whether or not they have been pulsed, that is, whether or not trapped flux is present.

It is a principal object of this invention to provide an integrating information storage apparatus.

Another object of this invention is to provide an apparatus including a cryogenic superconductive storage element which can be pulsed a number of times and the number of pulses determined at the termination of pulsing operations.

A further object of this invention is to provide an integrating process.

Other objects and advantages of this invention will be in part obvious and in part explained by reference to the accompanying specification and drawings.

In the drawings:

FIG. 1 schematically shows an integrating apparatus constructed according to the present invention;

Generally, the apparatus of the present invention comprises a member which can be rendered superconductive, means for subjecting the superconductive member to a field giving rise to supercurrent and a trapped flux field, means for intermittently pulsing the superconductor to destroy the supercurrent and thus cause the amount of flux to change, and means for measuring the amount of trapped flux remaining in the superconductor at the termination of intermittent pulsing. The integrating process of this invention generally comprises subjecting a superconductor containing trapped flux to a series of intermittent pulses and then measuring the amount of flux remaining in the superconductor to determine the number of times in which pulsing has been effected.

Figure 1:
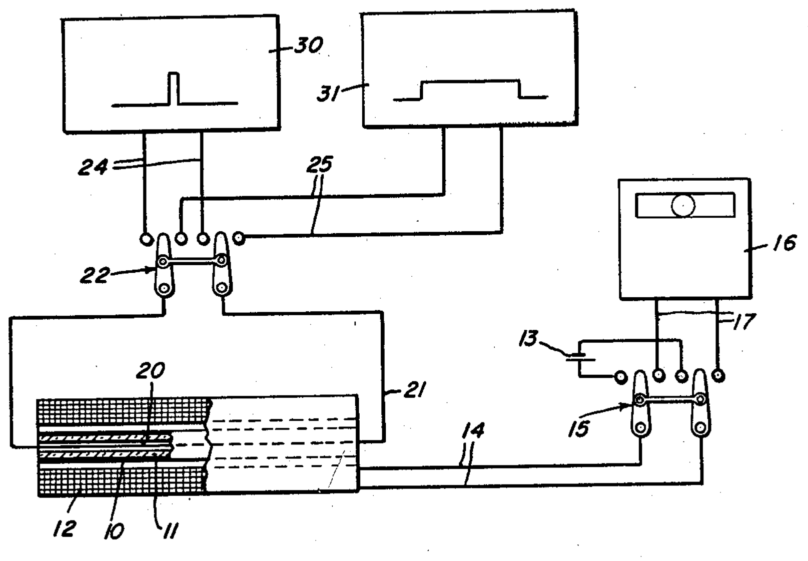

Referring specifically to FIG. 1 of the drawings, numeral 10 indicates an elongated, generally cylindrically-shaped film which has been suitably deposited on the surface of an insulating member 11. The film or member 10 is of a material capable of being rendered superconductive at low temperatures and has a multiply-connected surface, this being essential to operation of the device in the manner subsequently explained. Examples of suitable superconductive material are listed in Table I, following. This list is not meant to be limiting but only illustrative of the various types of materials which may be used.

*Table I*

| Substance | Critical Temp. $T_c$(° K.) | Critical Field $H_0$(oer.) |
|---|---|---|
| $Bi_2Pt$ | 0.16 | 10 |
| Ti (99.95%) | 0.40 | 20 |
| Cd | 0.56 | 30 |
| Ru | 0.47 | 46 |
| Zr | 0.55 | 47 |
| Ga | 1.10 | 51 |
| Zn | 0.91 | 53 |
| Ga | 1.09 | 59 |
| Os | 0.71 | 65 |
| Al | 1.17 | 104 |
| $CoSi_2$ | 1.40 | 105 |
| BiSn* | 3.80 | 130 |
| Th | 1.37 | 131 |
| Tl($\alpha$) | 2.39 | 171 |
| Re | 1.70 | 201 |
| MgTl | 2.75 | 220 |
| CdSn* | 3.60 | 266 |
| In | 3.40 | 278 |
| $In_xTh_y$ | 3.20 | 280 |
| Tc | 11.20 | 300 |
| Sn | 3.74 | 305 |
| $Sb_xSn_y$ | 3.96 | 321 |
| Hg($\alpha$) | 4.16 | 413 |
| $Bi_3Sr$ | 5.62 | 530 |
| $BaBi_3$ | 5.69 | 740 |
| Pb | 7.20 | 800 |
| Ta | 4.06 | 1,000 |
| V | 5.03 | 1,310 |
| La($\beta$) | 5.95 | 1,600 |
| U | 1.30 | 2,000 |
| $In_{.10}Pb_{.90}$Δ | 4.36 | 2,000 |
| Nb | 8.60 | 2,000 |

*Eutectic.
ΔComposition uncertain.

Surrounding the superconductor 10 in operative association therewith is magnet means shown as an electromagnetic coil 12. Coil 12 can be constructed of a material capable of being rendered superconductive if desired, although this is not essential to operation of the device. If a superconductive material is used, then it should have a higher critical field than the material used for superconductor 10. The purpose of this coil is to create a magnetic flux field which is along the axis of member 10 or perpendicular to the plane of the hole or opening, this field resulting in creation of a supercurrent in member 10 and consequent creation of the trapped flux. The electro-magnetic coil 12 is suitably connected to a source of direct current 13 as by means of wires 14 and switch 15. The switch 15 is a double-pole, double-throw switch which, in the other position, connects to an apparatus for measuring the amount of flux in coil 12 when trapped flux is being removed from superconductor 10. This measuring apparatus is shown in FIG. 1 as a fluxmeter 16, which is connected to switch 14 by means of wires 17. Obviously, other suitable indicating and/or recording apparatus may be substituted for fluxmeter 16.

Extending axially through an opening 20 in member 11 is a pulse wire 21 which may be superconductive or not. As was the case with coil 12, a superconductive pulse wire should have a higher critical field than member 10. This pulse wire is connected through the double-pole, double-throw switch 22, via wires 23, 24 and 25, to pulse wave generators 30 and 31. As indicated by the drawings, the pulse wave generators are fixed to subject pulse wire 21 to pulses of substantially different duration. The pulser 30 will supply very short pulses to the wire 21 so that only a portion of the flux in superconductor 10 will be destroyed by any single pulse. On the other hand, the pulse output of pulser 31 is of a duration sufficient to destroy essentially all of the flux trapped in superconductor 10.

Considering now a specific apparatus constructed along the lines of that shown in FIG. 1 and the integrating operation of such a device, a thin film of lead is deposited by vapor deposition upon the outer surface of insulating member 11, in this instance, a glass tube. The film is about 1 micron thick, 3/16 inch in diameter and about 1/2 inch long. For a superconductor of this shape and size, the time constant is about 1.2 microseconds so it will take about 1.2 microseconds to destroy 66 percent of the flux and 10 microseconds to discharge 99 percent of the flux. Thus, if the pulse applied to pulse wire 21 is only of about 1 microsecond duration, then about 60 percent of the flux will be destroyed because the element will again become superconducting when the pulse ceases. Another 1 microsecond pulse through the element will destroy more flux, although not exactly the same amount.

Generally, the decay of flux in any given superconductor will be given by the equation $$\phi=\phi_0 e^{-\frac{R}{L}t}$$

where $\phi_0$ is the flux at $t=0$ and R is the resistance of the superconductor, and L is the inductance. The resistance R is a function of the dimensions of the superconductor and the residual resistivity whereas the inductance L is a function only of the dimensions of the superconductor. For example, if the superconductor is made of lead and has a mean diameter of 0.5 centimeter, a thickness of 100 microns, and a residual resistivity of $5\times10^{-7}$ ohm-cm., then the time constant T is $$T=\frac{L}{R}=\frac{2\times10^{-8}}{2\times10^{-3}}=10\ \mu\text{sec.}$$

If the toroidal winding surrounding the superconductor is pulsed with a 1 microsecond square wave current pulse of sufficient magnitude to drive the superconductor normal, 10 percent of the flux will leak out. If it is pulsed a second time, 10 percent of the remaining flux will leak out. By providing means for measuring the initial flux and the flux remaining after $n$ pulses, the number $n$ can be determined. This final measuring operation is carried out by throwing switch 15 to the terminals, placing meter 16 in the circuit. The destruction of supercurrent causes a change in the flux linking coil 12 which induces a voltage measurable by meter 16 in terms of either flux or supercurrent, as desired. In this manner, the apparatus will integrate since the flux remaining after $n$ one microsecond pulses will be the same as after one $n$ microsecond pulses.

Figures 2, 3, 4:
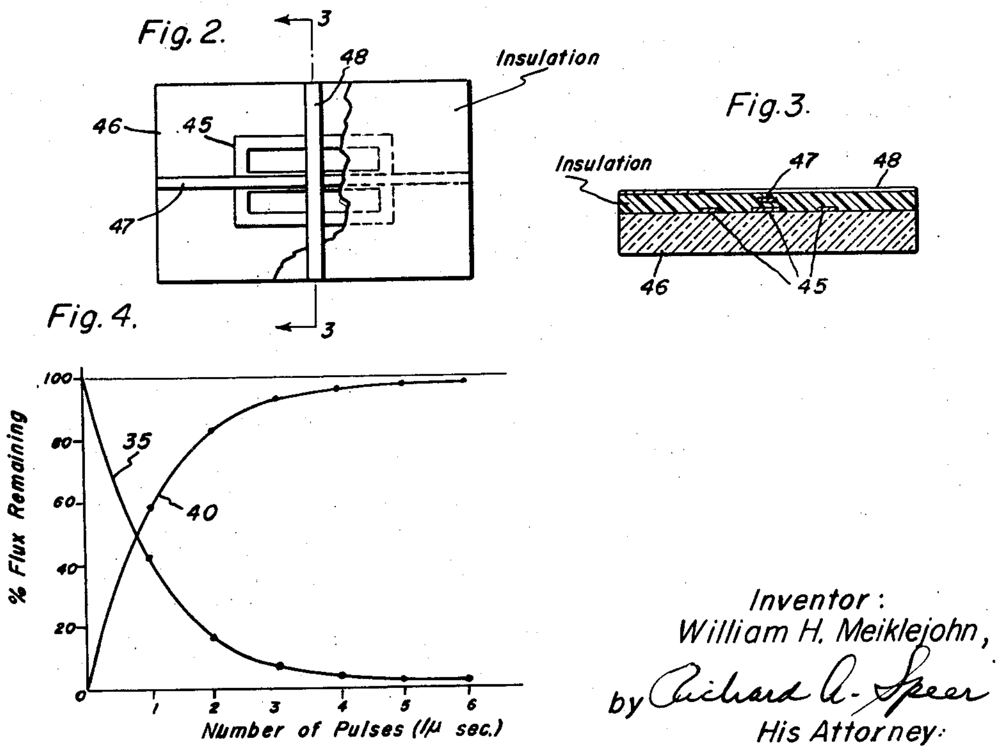
FIG. 2 is a front elevation of another type of information storage element which can be used in the present apparatus.
FIG. 3 is a sectional view taken along the line 3—3 of FIG. 2.
FIG. 4 is a graph showing the manner in which flux decays in the storage element when used according to the present invention.

The manner in which the flux decays during pulsing operations is clearly shown by curve 35 in FIG. 4 of the drawings where the percent remaining in the superconducting member has been plotted as a function of the number of pulses of one microsecond duration. It is obvious that less and less flux leaks out as the number of pulses increases, but it will also be appreciated that measurement of the amount of flux remaining at termination of sequential or intermittent pulsing operations permits determination of the number of times in which intermittent pulsing has been effected.

Essentially the same sort of curve will be obtained with 0.1 microsecond current pulses if the transition time from the superconnecting to the normal state and the reverse transition are short compared to the pulsing width. Transition times for thin films are believed to be on the order of millimicroseconds.

One method of operation of the device in FIG. 1 is effected by moving switch 15 to the terminals which connect coil 11 to the source of power 13. This connection will result in supercurrent being created within the superconducting member 10. With the supercurrent in member 10, the switch 15 is opened and switch 22 moved to connect pulse generator 30 to pulse wire 21 and destroy some proportion of the flux trapped in member 10. This operation can be effected any desired number of times. When it is finally desired to determine the number of times in which superconductor 10 has been pulsed, the switch 22 is connected to the terminals placing pulse generator 31 in operation so that all of the flux remaining in the superconductor is destroyed. At this time, switch 15 should be connected to the terminals placing meter 16 in the circuit so that the destruction of the supercurrent from superconductor 10 can induce current in coil 12 for measurement. Since the amount of supercurrent originally in the superconductor is known, it is then possible, using a curve like curve 35 of FIG. 4, to determine the number of pulses to which superconductor 10 had been subjected.

It will also be appreciated that the operation of the apparatus may be essentially reversed and still permit integration. Specifically, the superconductive member 10 may be placed in a superconductive state and subjected to a constant field from coil 12, which field is below the critical field of superconductor 10 so that it contains some supercurrent but no trapped flux. Intermittent pulsing of wire 21 will then drive superconductor 10 normal and trap flux in the superconductor. A series of pulses will result in incremental storage of flux, the storage being essentially the reverse of the decay method described earlier. Curve 40 of FIG. 4 illustrates the manner in which flux is stored. Discharge of the flux from the superconductor is effected in the same manner, that is, by effecting a pulse of duration sufficient to essentially discharge all of the trapped flux and determine the amount discharged as by means of meter 16.

The cylindrical type of superconductor shown in FIG. 1 can be replaced by superconductors of other geometries if desired. For example, FIGS. 2 and 3 of the drawings show a thin film superconductor which is of different geometry. Specifically, a thin film of superconducting material 45 has been deposited upon a glass plate 46 and a set and read-out thin film 47, which may or may not be superconducting and which corresponds to electromagnetic coil 12 of FIG. 1 and is similarly connected, is disposed in cooperative relationship with respect thereto. Also, a pulse thin film 48, which may or may not be superconducting, is disposed at right angles to the set and read-out coil to apply the pulses which destroy superconductive current and trapped flux within the film 45. In this construction, as in the construction in FIG. 1, the superconductive film 45 has a multiply-connected surface.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What I claim as new and desire to secure by Letters Patent of the United States is:

1. An integrating apparatus comprising, a superconductor having a multiply-connected surface, magnet means positioned to subject said superconductor to a magnetic field of predetermined strength, electric pulsing means operable for preselected times to change incrementally the trapped flux by rendering said superconductor electrically resistive to the preselected times, and means electrically connected to said magnet means to measure the amount of trapped flux remaining in said superconductor when a pulse of duration sufficient to destroy essentially all of the remaining flux is applied to said pulsing means after termination of incremental pulsing.

2. An integrating apparatus comprising, a superconductor having a multiply-connected surface, magnet means positioned to subject said superconductor to a magnetic field of predetermined strength, electric pulsing means electrically connected to said superconductor providing for the passage of current therethrough to change incrementally the trapped flux by rendering said superconductor electrically resistive for preselected periods of time, and means electrically connected to said magnet means to measure the amount of trapped flux remaining in said superconductor when a pulse of duration sufficient to destroy essentially all of the remaining flux is applied to said pulsing means after termination of incremental pulsing.

3. An integrating apparatus comprising, a generally cylindrically-shaped superconductor having an axial opening extending therethrough, electromagnet means positioned to subject said superconductor to a magnetic field of predetermined strength, electric pulsing means including a pulse wire extending through the axial opening of said superconductor, means for sending intermittent pulses of electricity through said pulse wire for preselected times changing incrementally the trapped flux by rendering said superconductor electrically resistive for the preselected times, and means electrically connected to said electromagnet means to measure the amount of trapped flux remaining in said superconductor when a pulse of duration sufficient to destroy essentially all of the remaining flux is applied to said pulsing means after termination of intermittent pulsing.

4. An integrating apparatus comprising, a storage element consisting of a thin film deposited on the surface of an electrically insulating base member, magnet means positioned to subject said thin film to a magnetic field of predetermined strength, electric pulsing means operable for preselected times changing incrementally the trapped flux by rendering the film electrically resistive for the preselected times, and means electrically connected to said magnet means to measure the amount of trapped flux remaining in the superconductive film when a pulse of duration sufficient to destroy essentially all of the remaining flux is applied to said pulsing means after termination of incremental pulsing.

5. An integrating apparatus comprising, a storage element consisting of a thin film deposited on the surface of an electrically insulating base member, magnet means positioned to subject said thin film to a magnetic field of predetermined strength, electric pulsing means electrically connected to the superconductive film providing for the passage of current therethrough for preselected times changing incrementally the trapped flux by rendering the film resistive for the preselected times, and means electrically connected to said magnet means to measure the amount of trapped flux remaining in the superconductive film when a pulse of duration sufficient to destroy essentially all of the remaining flux is applied to said pulsing means after termination of incremental pulsing.

6. An integrating apparatus comprising, an elongated superconductor having a multiply-connected surface, an electromagnetic coil surrounding said superconductor effective to subject said superconductor to a magnetic field of predetermined strength, electric pulsing means operable for preselected times changing incrementally the trapped flux by rendering said superconductor electrically resistive for the preselected times, and means electrically connected to said electromagnetic coil to measure the amount of trapped flux remaining in said superconductor when a pulse of duration sufficient to destroy essentially all of the remaining flux is applied to said pulsing means.

7. An integrating apparatus comprising, an elongated superconductor having a multiply-connected surface, means associated with said superconductor effective to subject said superconductor to a magnetic field of predetermined strength, electric pulsing means operable for preselected times changing incrementally the trapped flux by rendering said superconductor electrically resistive for the preselected times, and means electrically connected to said trapped flux creating means to measure the amount of flux remaining in said superconductor when a pulse of duration sufficient to destroy essentially all of the remaining flux is applied to said pulsing means after termination of incremental pulsing.

8. An integrating apparatus comprising, a superconductor having a multiply-connected surface, magnet means positioned to subject said superconductor to a magnetic field of predetermined strength, first electric pulsing means operable to render said superconductor electrically resistive for preselected times, second electric pulsing means operably connected to said superconductor to subject said superconductor to a pulse of duration sufficient to destroy any trapped flux contained therein, and means electrically connected to said magnet means to measure the amount of trapped flux remaining in said superconductor when said second pulse means is operated.

No references cited.